July 14, 1936.  J. E. POORMAN  2,047,222
TOOL HOLDER
Filed Oct. 23, 1934  2 Sheets-Sheet 1
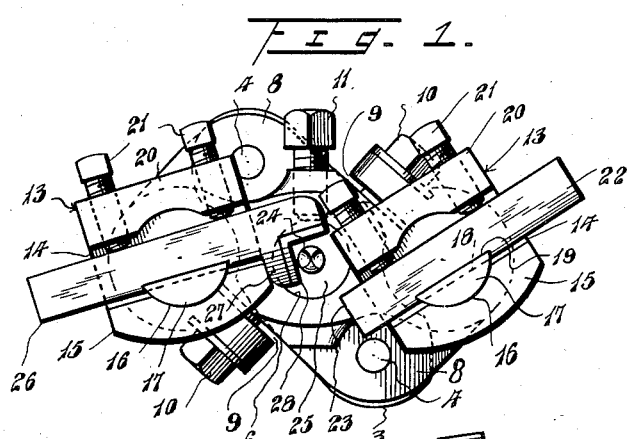
FIG. 1.
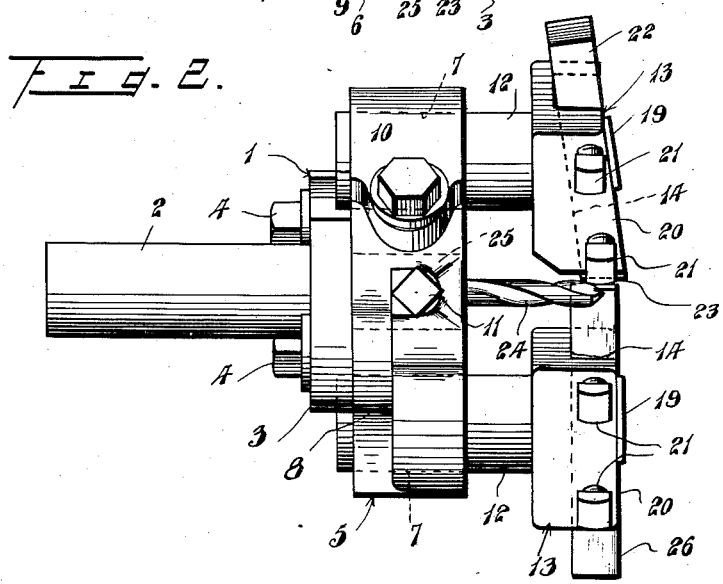
FIG. 2.
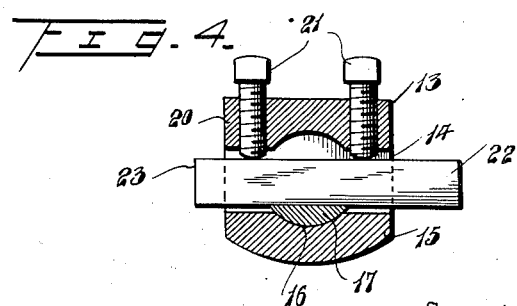
FIG. 3.
FIG. 4.
Inventor
J. E. Poorman.
By
Attorney July 14, 1936.   J. E. POORMAN   2,047,222
TOOL HOLDER
Filed Oct. 23, 1934   2 Sheets-Sheet 2
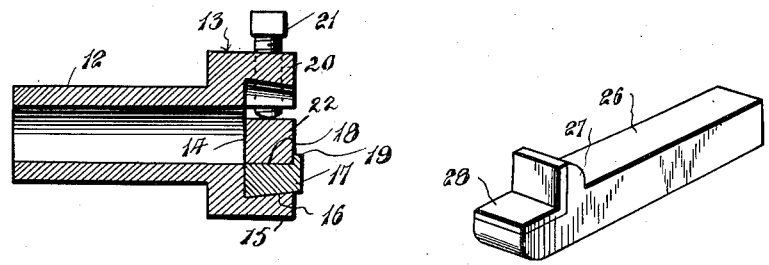
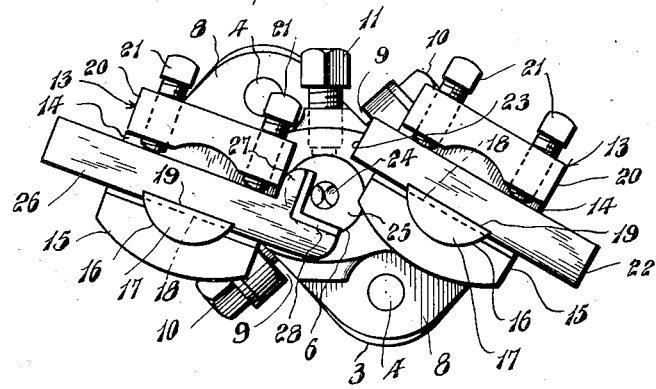
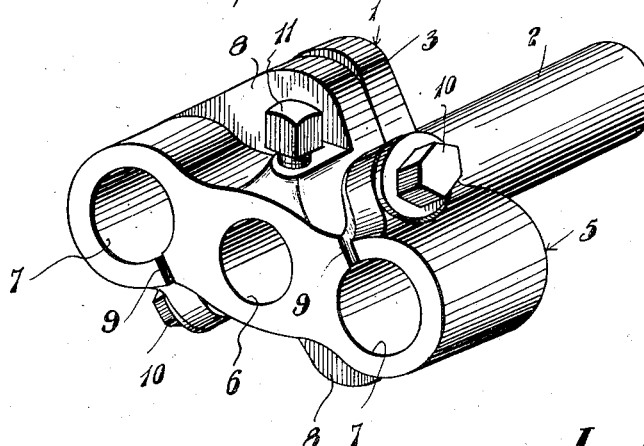
Inventor
J. E. Poorman
Attorney Patented July 14, 1936

2,047,222

UNITED STATES PATENT OFFICE 2,047,222

TOOL HOLDER

John E. Poorman, Philadelphia, Pa.

Application October 23, 1934, Serial No. 749,660

10 Claims. (Cl. 82—35)

This invention is directed to an improved tool holder for use in connection with lathes or the like wherein provision is made for proper adjustment and for reversal of operating parts to accommodate work-pieces operating in either direction.

The primary object of the present invention resides in adapting the conventional adjustable drill holder to adjustably accommodate auxiliary tool holders in addition to the conventional reception of a drill or other like tool, whereby a plurality of operations may be carried out on the work-piece at the same time.

A further object of the invention is the provision of sockets in the main holder in which are mounted for rotative adjustment auxiliary tool holders capable of being fixed in any rotative position with respect to the work; each tool holder having a head in which a tool or back-rest may be mounted for adjustment with respect to the work to insure proper operation on the work and proper support of the work while being operated on.

A still further object of the invention is the provision of a specific back-rest comprehending a single element adapted for adjustment in one of the auxiliary tool holders, which back-rest is notched at the operative end to cooperate with the work, with the bearing surfaces at this end faced with tantalum carbide to provide an extremely hard wear resisting material and obviate the use of the conventional rollers for this purpose.

The invention is illustrated in the accompanying drawings, in which:

Figure 1 is a face view of the improved tool holder, the improved back-rest and a conventional tool being shown in place in the respective auxiliary tool holders, a drill being also shown in position.

Figure 2 is a plan view of the same.

Figure 3 is a perspective view of one of the auxiliary tool holders, both such holders being identical, the tool proper being omitted.

Figure 4 is a vertical section through the auxiliary tool holder with a tool in place, showing more particularly the means for adjustment.

Figure 5 is a vertical section through the auxiliary tool holder transverse to the section of Figure 4.

Figure 6 is a perspective view of the improved back-rest.

Figure 7 is a face view similar to Figure 1, showing the back-rest and tool in reverse position with respect to Figure 1.

Figure 8 is a perspective view of the tool holder with the auxiliary tools removed.

The improved tool holder comprises the conventional T-shaped support 1 including the round shank 2 designed to be adjustably fitted in the usual turret or tool slide, with the plate 3 integral at one end of the shank extending in both directions beyond the same and providing with the shank the T form.

Removably secured to plate 3, as by cap-screws 4, is an auxiliary head base plate 5 of appreciable thickness axially of the shank 2 and formed with a central opening 6 and with end openings 7. The base plate is formed to provide ears 8 offset from the plane of the openings 6 and 7 and of materially reduced thickness as compared with the rest of the plate, the ears 8 being formed for the reception of the cap-screws and providing the means for rigidly securing the base plate to the T-shaped support 1.

The walls of the openings 7 are longitudinally split at 9 and laterally thickened to provide for the reception of cap-screws 10, whereby the interior diameter of the openings may be varied to permit adjustment of the auxiliary tool holders and to secure them in adjusted position, as will later appear. A set-screw 11 operates through the wall of the central opening 6 and is designed to rigidly but removably secure a single operating tool to be later referred to.

The auxiliary heads are identical in form and designed for respective cooperation with the openings 7. Each auxiliary head through a shank 12 is designed to be longitudinally and rotatably adjustable in one of the openings 7, the cap-screw 10 serving, of course, to hold the head in any desired position of rotary or longitudinal adjustment. The auxiliary head includes an approximately rectangular section forming an integral end section 13 which forms an integral part of one end of the shank 12. This rectangular section is formed in the face remote from the shank 12 with a tool receiving channel 14 and it is to be noted that the rectangular end section of the auxiliary head is so formed on the shank that the portion thereof at one side of the shank in the direction of the channel 14 is of less length than the portion in the opposite direction with respect to the shank; that is to say, the rectangular section is not centralized with respect to the shank in the longitudinal direction of the slot but is offset from such central relation, as clearly shown.

One wall, as 15, of the channel 14 is formed with a rounded depression 16 and a bearing block 17 is shaped to accurately fit this depression on one edge, the opposite surface of the block, as 18, being plain and projecting beyond the inner surface of the wall 15 on the opposite sides of the depression 16, so that the bearing block forms the support for the tool proper. This bearing block is of greater thickness axially of the shank 12 than the similar dimension of the wall 15 and the inner tool supporting surface 18 of the bearing block is provided with an upstanding lip 19, the inner surface of which coincides with the face of the section 13, so that the lip forms a guide or projection against the outer surface of the tool.

The opposite wall 20 of the channel 14 is provided near each end with set-screws 21 designed to bear upon the tool in both directions beyond the bearing block 17, so that the tool, through the medium of the set-screws, may be rocked in the depression 16 for the fine adjustment of the tool, the set-screws providing, of course, a means for fixing the tool in the desired position of adjustment.

The shanks 12 of the auxiliary heads are, of course, mounted in the end openings 7 of the base plate, being in such mounting capable of rotary and longitudinal adjustment with respect to the base plate, the cap-screws 10 serving to fix the auxiliary heads in the desired position to hold the tools, following the necessary finer adjustment in the auxiliary heads to the work. The tools proper 22 are of any conventional form for the work designed, being here shown as bar-like elements capable of cooperating with the auxiliary heads in the manner described and formed at the operative end with the appropriate cutting edge 23.

The central opening 6 of the base plate is designed to receive a tool, such as a drill, reamer or other appropriate tool, a drill being shown at 24 held in a block 25 designed to accurately fit in the opening 6 and be held rigidly therein through the medium of the set-screw 11. In this connection, of course, it will be appreciated that the tool seated in the opening 6 is operating centrally on the work-piece while the cutting or other shaping tools are operating on the surface of the work-piece in both directions beyond the central tool.

In connection with the tool holder, there is provided an improved back-rest having a body 26 conforming in size and shape to that of the tools proper and designed to cooperate with one of the auxiliary tool heads and to be adjusted therein in identical manner with the adjustment of the tools proper. This body is provided with an upstanding projection 27 forming a right angle with the body, the surfaces of which right angled portion are designed to engage the work for the usual functions of a back-rest. The working surfaces of the back-rest are, for the purposes of this invention, faced with tantalum carbide sections 28 which, by reason of its known hardness, provides an extremely efficient wear-resisting surface for engaging the work-piece. This back-rest, subject to and capable of all the adjustments of the tools proper, is constructed as a rigid immovable member and thus avoids all the odjections incident to the usual roller employed for this purpose and which is subject to inaccuracy incident to the accumulation of cuttings between the roller and work-piece and the extreme wear and pressure on the axis of the roller. With the improved back-rest having the work-piece faces of independent material having extreme hardness and wear resistance provided as a rigid element capable of extreme nicety of adjustment with respect to the work-piece, the maximum efficiency of such an accessory is well provided for.

A characteristic and important feature of the present invention is the convenient reversibility of the tools or of a tool and work-piece in order to accommodate movement of the work-piece in either direction. Obviously, by loosening a particular tool in the auxiliary tool holder and reversing the position of its cutting edge, or reversing the position of the work-engaging bearing surfaces of the back-rest and at the same time adjusting the auxiliary holders carrying the tool and work-piece to properly position them with respect to the work, it is apparent that the improved tool holder provides, through a simple, convenient and readily perfected operation, a complete reversal of the back-rest and tool to thus provide in a single tool-head a means which will insure proper work on the work-piece, no matter in which direction it may be rotating. Of course, the auxiliary tool holders may each accommodate a tool instead of utilizing one of said auxiliary work holders to receive and support the back-rest.

Where the auxiliary work-holders are used for tools, it is apparent that the tools may be set for proper cooperation with the work from opposite sides and, by reason of the adjustment provided in the openings 7 of the auxiliary tool holders, the tools may be set to operate in line transversely of the work-piece or one or the other of such tools may be given a lead over the other, that is, operate in offset planes. This permits of the use of a tool doing coarse or heavy cutting, followed by a tool doing finer work, the use of different tools being thus provided for, if desired.

With the improved tool holder, the use of two tools, one tool and the back-rest may be readily accommodated and during the operation on the exterior surface of the work-piece, any desired tool secured within the opening 6 may be operating longitudinally and centrally of the work-piece. Thus, a plurality of operations may be simultaneously carried out on the work-piece with each and every part necessary for such operations capable of any and all adjustments necessary to secure the desired result.

While reference is made above specifically to tantalum carbide as the facings for the back-rest, it is to be understood that no limitation is intended thereby and that the invention contemplates other equally hard or harder substances which may be now known or hereafter developed for this purpose.

What is claimed to be new is:

1. A tool holder comprising a T head for removable mounting in a tool slide or turret, a base plate removably secured to said head, a central tool receiving opening formed in the base plate, auxiliary tool head receiving openings arranged on opposite sides of the central tool opening, auxiliary tool heads each including a shank to engage with an auxiliary tool head receiving opening, a head section at the end of the shank, and a tool receiving channel transverse said head section, the adjustment of the auxiliary tool head and the reversibility of the tool in the channel providing for proper placement of the opposing tools to cooperate with the work-piece rotating in either direction.

2. A tool holder comprising a T head for removable mounting in a tool slide or turret, a base plate removably secured to said head, a central tool receiving opening formed in the base plate, auxiliary tool head receiving openings arranged on opposite sides of the central tool opening, auxiliary tool heads each including a shank to engage with an auxiliary tool head receiving opening, a head section at the end of the shank, a tool receiving channel transverse said head section, the adjustment of the auxiliary tool head and the reversibility of the tool in the channel providing for proper placement of the opposing tools to cooperate with the work-piece rotating in either direction, one wall of the tool channel being formed with a rounded depression, a bearing block fitted in said depression and providing the support for the tool, and means carried by the opposite wall of the channel to adjust the tool and lock it in the channel.

3. A tool holder comprising a T head for removable mounting in a tool slide or turret, a base plate removably secured to said head, a central tool receiving opening formed in the base plate, auxiliary tool head receiving openings arranged on opposite sides of the central tool opening, auxiliary tool heads each including a shank to engage with an auxiliary tool head receiving opening, a head section at the end of the shank, a tool receiving channel transverse said head section, the adjustment of the auxiliary tool head and the reversibility of the tool in the channel providing for proper placement of the opposing tools to cooperate with the work-piece rotating in either direction, and means for locking the auxiliary tool heads in desired rotative and longitudinal adjustment with respect to the base plate.

4. A tool holder including a T-support for co-operation with a turret, a base plate removably secured to the support, said base plate being formed with a tool receiving opening in axial alignment with the work-piece and opposite openings having longitudinally divided walls, an auxiliary tool head including a shank mounted for rotative and longitudinal adjustment in each of said openings, and means for clamping the walls of the openings on the auxiliary tool head to maintain the adjusted relation.

5. A tool holder including a T support for co-operation with a turret, a base plate removably secured to the support, said base plate being formed with a tool receiving opening in axial alignment with the work-piece and opposite openings having longitudinally divided walls, an auxiliary tool head including a shank mounted for rotative and longitudinal adjustment in each of said openings, and means for clamping the walls of the openings on the auxiliary tool head to maintain the adjusted relation, each of the auxiliary tool heads being formed with a tool receiving channel to adjustably and reversibly receive a tool.

6. A tool holder including a T support for co-operation with a turret, a base plate removably secured to the support, said base plate being formed with a tool receiving opening in axial alignment with the work-piece and opposite openings having longitudinally divided walls, an auxiliary tool head including a shank mounted for rotative and longitudinal adjustment in each of said openings, means for clamping the walls of the openings on the auxiliary tool head to maintain the adjusted relation, each of the auxiliary tool heads being formed with a tool receiving channel to adjustably and reversibly receive a tool, means in each auxiliary tool head for rockingly supporting the tool, and means carried by each auxiliary tool head to lock the tool in desired adjustment both with respect to its rocking movement and with respect to its longitudinal adjustment.

7. A tool holder including a T support for co-operation with a turret, a base plate removably secured to the support, said base plate being formed with a tool receiving opening in axial alignment with the work-piece and opposite openings having longitudinally divided walls, an auxiliary tool head including a shank mounted for rotative and longitudinal adjustment in each of said openings, means for clamping the walls of the openings on the auxiliary tool head to maintain the adjusted relation, each of the tool heads being formed with a transverse channel, and a back-rest adjustably mounted in said channel.

8. A tool holder including a T support for co-operation with a turret, a base plate removably secured to the support, said base plate being formed with a tool receiving opening in axial alignment with the work-piece and opposite openings having longitudinally divided walls, an auxiliary tool head including a shank mounted for rotative and longitudinal adjustment in each of said openings, means for clamping the walls of the openings on the auxiliary tool head to maintain the adjusted relation, each of the tool heads being formed with a transverse channel, and a back-rest adjustably mounted in said channel said back-rest being a single unitary element formed at one end with right angled surfaces to cooperate with the workpiece.

9. A tool holder including a T support for co-operation with a turret, a base plate removably secured to the support, said base plate being formed with opposite openings having longitudinally divided walls, an auxiliary tool head including a shank mounted for rotative and longitudinal adjustment in each of said openings, means for clamping the walls of the openings on the auxiliary tool head to maintain the adjusted relation, each of the auxiliary tool heads being formed with a tool-receiving channel, a back-rest adjustably mounted in said channel and formed with right angularly related work-piece engaging surfaces, and a wear resisting section of tantalum carbide permanently secured to each of said surfaces.

10. A tool holder assembly including a plate formed with spaced tool head receiving openings, an auxiliary tool head for each opening and including a shank mounted for rotary and longitudinal adjustment in an opening, means for clamping the walls of the opening on the shank of the tool head to maintain the adjusted relation, each of the tool heads being formed with a transverse tool receiving channel, means in each channel for rockingly supporting the tool, and means carried by the head to lock the tool in desired rocking adjustment at will.

JOHN E. POORMAN.